Feb. 28, 1961        R. G. BRYAN ET AL        2,973,194
FLUID DISTRIBUTION CONTROL SYSTEM
Filed May 28, 1956
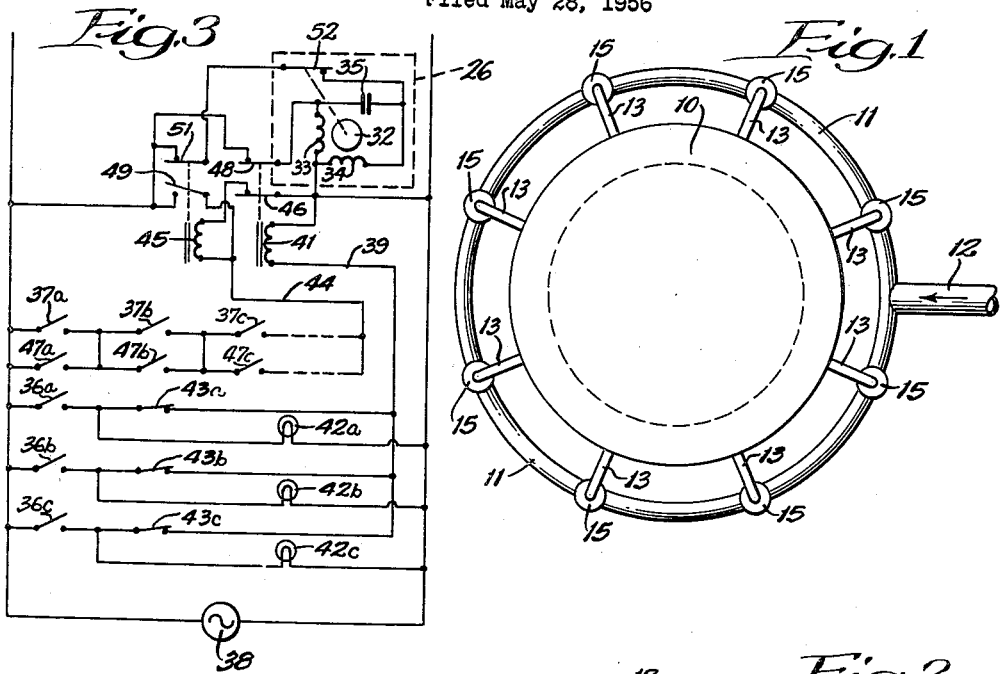
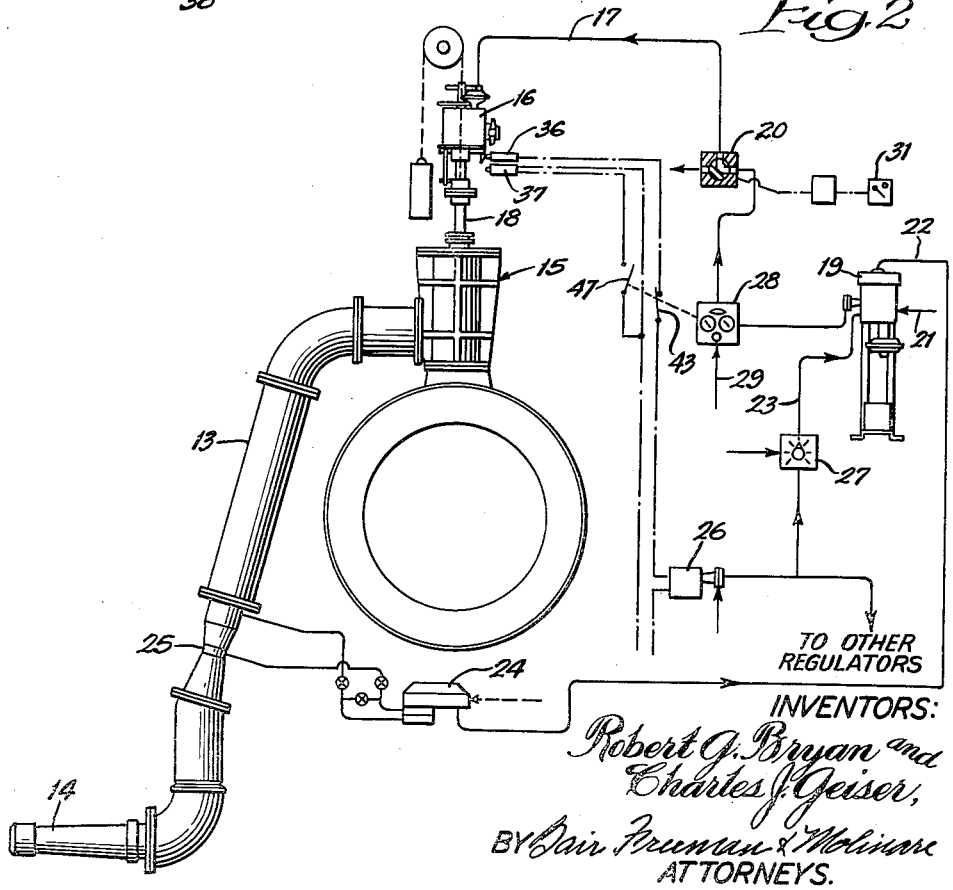
INVENTORS:
Robert G. Bryan and
Charles J. Geiser,
BY Bair Freeman & Molinare
ATTORNEYS.

United States Patent Office 2,973,194
Patented Feb. 28, 1961

2,973,194
FLUID DISTRIBUTION CONTROL SYSTEM

Robert G. Bryan, Evergreen Park, and Charles J. Geiser, Chicago, Ill., assignor, by mesne assignments, to Republic Flow Meters Company, Chicago, Ill., a corporation of Delaware Filed May 28, 1956, Ser. No. 587,655

9 Claims. (Cl. 266—30)

This invention relates to fluid distribution control systems and more particularly to a system for controlling the distribution of flowing fluid among a plurality of flow conduits connected to a common manifold or the like.

Many types of industrial equipment require the maintenance of correct proportioning of fluid flows through a plurality of flow conduits for correct distribution of the fluid. One example of such equipment is a blast furnace wherein it is desired to maintain the flow of air from a bustle pipe through a plurality of different tuyeres into the furnace in desired proportions to maintain correct distribution of air in the furnace. The invention will be described specifically in connection with this application although it is understood that the same control system could be used in many other places involving control of flows.

Due to the fact that the resistance to flow through the different tuyeres varies it is impossible to effect proper distribution merely by positioning control valves for the different tuyeres simultaneously. Furthermore, it is unsatisfactory to select any one valve or even the total flow through the valves to provide a master controlling force for all of the valves since such an arrangement might result in incorrect distribution or in moving all of the valves to a partly closed position with consequent loss of efficiency.

According to the present invention, the correct proportions of air and maximum efficiency are obtained by individually controlling the valves in accordance with the balance between the master controlling force and the flows through the individual conduits and by varying the master controlling force in accordance with the position of the valve which is most nearly fully open. Stated in another way, the master controlling force is adjusted in a direction to adjust all valves toward closing position when any one valve is fully opened and to adjust all valves toward open position when all of the valves are below a predetermined partly opened position.

It is accordingly one of the objects of the present invention to provide a fluid distribution control system in which correct proportions of the flows through a plurality of conduits are obtained without unnecessarily restricting any of the conduits.

Another object is to provide a fluid distribution control system in which the proportions of the flows through the conduits are easily adjusted by individually adjusting the master control force applied to the individual valves.

A further object is to provide a fluid distribution control system in which the control valves may be individually subjected to manual control without interfering with the operation of the system as to the remaining valves.

The above and other objects and features of the invention will be more readily apparent from the following description when read in connection with the accompanying drawing, in which:

Figure 1 is a diagrammatic plan view of a blast furnace having a distribution system embodying the invention;

Figure 2 is a diagrammatic view of the control for an individual flow conduit and valve, and Figure 3 is a wiring diagram.

Figure 1 illustrates diagrammatically a blast furnace system wherein a blast furnace, indicated at 10, is supplied with air from an annular bustle pipe 11 surrounding the furnace. Air is supplied to the bustle pipe through a supply conduit 12 and is distributed from the bustle pipe through a plurality of conduits 13 leading to tuyeres 14, as shown in Figure 2, which supply the air to the furnace. Each conduit 13 is controlled by a valve 15 and distribution of the air under the several conduits is maintained in correct proportion by manipulation of the several valves 15.

As shown in Figure 2, each valve 15 is moved by a power operator 16 and is operated in response to fluid pressure supplied thereto through a supply line 17. The power operators 16 may be in the form of conventional positioning type regulators having stems 18 connected directly to the valves and moving the valves to different positions proportional to the pressure of fluid supplied through the conduits 17. The conduit 17 for each valve is supplied with controlling fluid pressure through a three-way cut-off valve 20 from a regulator 19. The regulator 19 is of conventional construction supplied with air through a supply conduit 21 and varying the pressure supplied to the conduit 17 in accordance with the balance between the pressure supplied to a controlling diaphragm, or the like, through a pipe 22 and a master loading pressure supplied through a pipe 23. The pipe 22 is supplied with pressure from a transmitter 24 whose output pressure is responsive to the flow through the corresponding conduit 13. For this purpose, the conduit 13 is formed with a reduced venturi section 25 and the transmitter is connected to a point upstream of the venturi throat and the venturi throat, as shown, to produce an output pressure proportional to the flow through the conduit. This output pressure is supplied to the regulator 19 and is balanced against the master loading pressure supplied to the regulator through the pipe 23 so that the regulator will tend to control the power operator 16 to position the valve such that the flow through the conduit 13 is proportional to the master loading pressure. Since the same master loading pressure is applied to the regulators for all of the valves, as explained hereinafter, the valves tend to be independently positioned by their respective control regulators to maintain proportional flow through the several conduits 13.

The master loading pressure is supplied from a master control device 26 which is preferably electrically actuated to vary the master loading pressure. The master control device 26 is connected through individual manually adjustable pneumatic relays 27 to the several regulators 19 in parallel. Thus, when the master loading pressure is changed, all of the regulators will be affected proportionately in the same direction either to open all of the valves simultaneously or to close all of the valves simultaneously.

The ratio relays 27 may be individually adjusted manually to increase or decrease the master loading pressure supplied to the individual regulators thereby to provide a proportional setting of the flows for the desired distribution. In this way, the flows through the several conduits 13 may be proportioned in any desired ratio to obtain a desired distribution of air flows without necessarily maintaining all of the flows equal.

In the event it is desired to control any one of the valves manually for emergency operation or other purposes without affecting the remainder of the system, a manual control panel 28 may be employed in the pipe 17 from the regulator 19 to the power operator 16. The manual control panel consists of a transfer valve which is normally positioned to connect the output of the regulator 19 to the power operator 16 but which may be turned to cut off the output of the regulator 19 and to connect the power operator 16 through a manually adjustable regulator to an air supply indicated at 29. In this position of the manual control panel, the valve is controlled manually although the remaining valves in the system may still be under automatic control.

The three-way valves 21 are provided so that all of the valves can be opened simultaneously when desired and the three-way valves for the different control valves may be operated simultaneously through solenoids or the like under the control of a master switch 31. Normally, the three-way valves are in the position shown in Figure 2 to transmit controlling pressure either from regulator 19 or manual control panel 28 to the power operators 16. When the valves are turned counter-clockwise through 90° from the position shown, all of the power operators 16 will be vented simultaneously and the power operators may be set so that this will cause all of the control valves 15 to move to their fully open or fully closed positions.

The master control device 26, as shown diagrammatically in Figure 3, includes a reversible electric motor 32 having two windings 33 and 34 and a phase shift condenser 35. The motor 32 operates a conventional pressure regulator which will vary the master loading pressure supplied to the several regulators 19 through the pipes 23, depending upon the direction of rotation of the motor.

The master control device is controlled in accordance with the positions of the several main control valves 15 so that it will always be maintained at a value which will keep all of the valves at the most nearly open position possible under the existing requirements. For this purpose, each valve 15 controls two switches 36 and 37, the switch 36 being closed when the valve is in its fully open position and the switch 37 being closed when the valve is in or below a predetermined partially open position, such as 90% open. As seen in Figure 3, the several switches 36, therein indicated as 36a, 36b, and 36c, are connected in parallel between one side of a power source indicated at 38 and a line 39 which leads through a relay coil 41 to the opposite side of the source. Signal lights 42a, 42b, and 42c may be connected through the switches 36a, 36b, and 36c across the power source to indicate when any of the switches 36a, 36b, or 36c, is closed and its corresponding valve is in fully open position. Switches 43, indicated in Figure 3 as 43a, 43b and 43c, are connected in series with the switches 36a, 36b and 36c respectively and may be connected to the manual control panel 28 to be opened when the corresponding valve is moved to manual position so that closing of the corresponding one of the switches 36a, 36b and 36c even though the valve is fully opened, will not affect the control circuit.

The several switches 37, indicated in Figure 3 as 37a, 37b and 37c are connected in series between one side of the power source and a line 44 leading through a relay coil 45 and a normally closed switch 46 to the opposite side of the source. The switch 46 is closed when the coil 41 is deenergized and is opened when the coil 41 is energized to prevent a simultaneous energization of both coils. Thus the coil 45 will be energized only when all the switches 37a, 37b and 37c are closed, indicating that all of the valves are at or about their 90% open position and when the coil 41 is deenergized, indicating that no valve is in its fully open position.

The switches 37a, 37b and 37c are respectively shunted by switches 47a, 47b and 47c which are normally open and which are individually closed when the manual control valve 28 is switched to its manual control position. Thus automatic control of the remainder of the valves which are not switched to manual control position remains possible without interference from the one or more valves which are on manual control.

In addition to opening the switch 46, the coil 41 opens a second switch 48 when it is energized. The switch 48 connects one side of the power source directly through the winding 33 to the opposite side of the source and through the condenser 35 and winding 34 to the opposite side of the power source. When the motor is energized only through the switch 48 it tends to turn in a direction which will adjust the master control pressure in a direction to cause all of the valves to move toward their open positions.

The coil 45 when energized closes a normally open switch 49 and opens a normally closed switch 51. The switch 49 is a holding switch for the coil 45 to maintain it energized as long as the switch 46 is closed. The switch 51 connects one side of the power source through a limit switch 52 directly through the winding 34 to the opposite side of the power source and through the condenser 35 and winding 33 to the opposite side of the power source. When the motor is energized only through the switch 51 it tends to run in a direction to cause all of the control valves 15 to close. When both switches 51 and 48 are closed, the motor windings are energized in the same phase relationship and the motor is electrically braked so that it tends to remain in whatever position it occupies. The limit switch is provided similarly to prevent over adjustment in the valve opening direction and damage to the parts.

In operation of the system, assuming that all of the parts are in a position between 90% open and 100% open, the control circuit of Figure 3 will be in the condition illustrated with all of the switches 36 and 37 open and with the motor magnetically braked to hold the master control device 26 in its existing position of adjustment. At this time, the several control valves 15 will be individually controlled through their regulators 19 and power operators 16 to maintain the desired proportion of flow through the several conduits 13, as determined by adjustment of the ratio controllers 27. Assuming that the resistance to flow through any one of the conduits should increase to the point where its valve moves to fully open position, the switch 36 corresponding to that valve will be closed to energize the relay coil 41 and open the switches 46 and 48. At this time, the motor will be energized only through the switch 51 and will turn in a direction to adjust the master control pressure to cause all of the valves simultaneously to move toward their closed positions. Thus operation will continue until the valve which had gone fully open is moved to a position below its fully open position at which time the closed switch 36 will reopen and the circuit will return to its balanced condition, as shown in Figure 3. It is thus insured that all of the valves are maintained in a position below their fully open position so that flows through the several conduits can be properly controlled to maintain correct proportioning of this flow under all operating conditions.

In the event that all of the valves should move to a position below their 90% open positions under the existing master loading pressure, all of the switches 37 would close and the relay coil 45 would be energized. When this occurs, switch 49 will close to hold the coil 45 energized as long as switch 46 remains closed and switch 51 will open. At this time, the motor is energized only through switch 48 and runs in a direction to adjust the master loading pressure in a direction to open all of the valves simultaneously. This adjustment will continue until one of the valves reaches its fully open position at which time the relay coil 41 will be energized to open the switch 46 and deenergize the relay coil 45 and to readjust the master loading pressure in the opposite direction until the fully opened valve is back in the control range. Thus, with the present system no valve is permitted to remain fully open and thereby to interfere with desired distribution of air nor can all of the valves be adjusted to a position below a predetermined open position, such as 90% open, to interfere with efficient functioning of the apparatus. It is further possible at any time to place any one or more valves under manual control without interfering with automatic control of the remainder of the valves and to adjust the proportional flows through the several valves to obtain a desired unequal, but proportional flow of distribution.

While one embodiment of the invention has been shown and described herein, it will be understood that it is illustrative only and not to be taken as a definition of the scope of the invention, reference being had for this purpose to the appended claims.

What is claimed is:

1. A fluid distribution control system comprising a fluid manifold, a plurality of fluid flow conduits communicating with the manifold, a control valve controlling the flow through each of the conduits, a power operator for each of the valves, parallel connections from a source of power to all of the power operators, a control device simultaneously to control the supply of power from the source to all of the power operators, means responsive to the fluid flows through the conduits respectively to modify the operation of the individual power operators whereby the valves tend to be adjusted to produce a desired proportional flow through the conduits, a control unit operated by each of the valves when it is opened beyond a predetermined position, the control units being connected in parallel in a control circuit to the control device to operate it in a direction to close all of the valves simultaneously when and only so long as any one of the control units is operated, and a second control unit operated by each of the valves when it is below a predetermined partially open position, the second control units being connected in series in a control circuit to the control device to operate it in a direction to open all of the valves when all of the second control units are operated simultaneously, and means operable upon actuation of said control device by said second control units for maintaining actuation of said control device in the valve opening direction until one of the valves is opened beyond said predetermined position.

2. The system of claim 1 including manual means to disconnect each of the power operators from the source and to supply manually controlled power to the disconnected power operators, and means operated by the manual means to disconnect the control units for the respective valves from the control circuits.

3. The system of claim 1 including a ratio control device in each of the parallel connections from the power source to the power operators to vary the ratio of the power supplied to the power operator relative to the power supplied by the source.

4. A fluid distribution control system comprising a fluid manifold, a plurality of fluid flow conduits communicating with the manifold, a control valve controlling the flow through each of the conduits, a fluid powered operator for each of the valves, parallel connections from a source of operating fluid to the operators, an adjusting valve between the source and the operators simultaneously to adjust all of the operators toward valve closing or valve opening position, means responsive to the flows through the conduits respectively to modify the pressure of the operating fluid supplied to the individual power operators, a first electric switch closed by each of the valves when it is in full open position, the first switches being connected in parallel in a first control circuit, a second electric switch closed by each of the valves when it is below a predetermined partially open position, the second switches being connected in series in a second control circuit, and electrically operated adjusting means for the adjusting valve connected to both of the control circuits to adjust it in a direction to close the control valves when and only so long as any one of the first switches is closed and to open the control valves after all of the second switches have been closed and until one of the first switches is closed.

5. The system of claim 4 including manual means to disconnect each of the operators from the source and to supply fluid under manual control to the operator, means operated by the manual means to disconnect the first switch corresponding to the disconnected operator from the first control circuit, and a switch closed by the manual means and shunting the second switch corresponding to the disconnected operator.

6. A fluid distribution control system comprising a fluid manifold, a plurality of fluid flow conduits communicating with the manifold, a control valve controlling the flow through each of the conduits, a power operator for each of the control valves, a regulator for each power operator, parallel connections to the regulators from a source of operating force, connections from the regulators to the flow conduits respectively to modify the operating force transmitted to the power operator in accordance with flow through the corresponding conduit, a control device simultaneously to control the operating force supplied from the source to all of the regulators to cause all of the valves to open or close simultaneously, a first control unit operated by each valve when it is fully open, the first control units being connected in parallel to the control device to cause all of the valves to move toward closed position when and only so long as any one of the first control units is operated and a second control unit operated by each of the valves when it is below a predetermined partially open position, the second control units being connected in series to the control device to cause all of the valves to move toward open position after all of the second control units have been operated until one of the first control units is operated.

7. A fluid distribution control system comprising a fluid manifold, a plurality of fluid flow conduits communicating with the manifold, a control valve controlling the flow through each of the conduits, a power operator for each of the valves, parallel connections from a source of power to all of the power operators, a control device simultaneously to control the supply of power from the source to all of the power operators, means responsive to the fluid flows through the conduits respectively to modify the operation of the individual power operators whereby the valves tend to be adjusted to produce a desired proportional flow through the conduits, a first control unit operated by each of the valves when it is opened beyond a predetermined position, means connecting the first control units to the control device to operate it in a direction to close all of the valves simultaneously when and only so long as any one of the first control units is operated, a second control unit operated by each of the valves when it is closed beyond a predetermined partially open position, and means connecting the second control units to the control device to operate it in a direction to open all of the valves simultaneously after all of the second control units have been operated simultaneously until one of the valves actuates the associated one of said first control devices.

8. Control means for a blast furnace wind distribution system which system includes plural leg pipes for respectively supplying blast air to different tuyeres and each provided with a valve having a body that is adjustable in position to vary an internal pressure condition of that leg pipe, an individual relay for adjusting the position of each said valve body, individual means connected with each said leg pipe for developing a leg pipe signal of magnitude corresponding to volume rate of air flow through that leg pipe, means for developing a master signal and individual regulator means for each said relay comprising a device for comparing magnitudes of the leg pipe signal of that leg pipe and said master signal and adjusting the leg pipe valve body of that leg pipe upon departure of said signal magnitudes from a preselected ratio to restore that ratio by adjusting that valve body to vary said pressure condition, said control means comprising a system for controlling the magnitude of said master signal, and operating, after all of said leg pipe valves have been more closed than to a preselected limit degree, to vary said master signal in the sense tending to operate said individual relays to adjust said valves toward more open conditions until one of said valves is opened to a preselected limit condition of opening operating when and only so long as any of said valves is opened to said preselected limit condition of opening to vary said master signal in the opposite sense, and operating to maintain said master signal magnitude constant while all said valves are more closed than said limit condition of opening and at least one of them is more open than said limit degree, said system comprising means for varying the magnitude of said master signal and including a control member that is movable in opposite first and second directions respectively to vary magnitude of said master signal in the senses respectively tending to open and close said valves by operation of said individual relays, first and second signal devices operably connected to each of the valves, the first signal devices being operated when the valves are more nearly closed than a predetermined amount and the second signal devices being operated when the valves are more open than a larger predetermined amount, a first relay connected to all of said first signal devices and controlled by simultaneous operation of all of said first signal devices to move said control member in said first direction and to terminate that movement when any one of the valves is open more than said first named predetermined amount, and a second relay connected to all of said second signal devices and controlled by operation of any one of said second signal devices to move said control member in said second direction.

9. A fluid distribution control system comprising a plurality of flow control devices independently controlled with respect to a preselected range of control settings, means responsive to movement of any one of said devices to a setting corresponding to one limit of said range for actuating all of said devices in a direction opposite to said one limit so long as any one of said devices remains at a setting corresponding to said one limit, and means responsive to movement of all of said devices beyond the other limit of said range for actuating all of said devices in a direction toward said one limit until one of said devices reaches said one limit.

References Cited in the file of this patent

UNITED STATES PATENTS

| | | |
|---|---|---|
| 2,083,046 | Burke | June 8, 1937 |
| 2,774,368 | Jones | Dec. 18, 1956 |